UNITED STATES PATENT OFFICE.

AMOS MOORE RANNEY, OF WATROUS, SASKATCHEWAN, CANADA.

FIRE-GUARD.

1,093,205.  Specification of Letters Patent.  Patented Apr. 14, 1914.

Application filed April 11, 1913. Serial No. 760,486.

*To all whom it may concern:*

Be it known that I, AMOS MOORE RANNEY, of the town of Watrous, in the Province of Saskatchewan, Canada, have invented certain new and useful Improvements in Fire-Guards, of which the following is the specification.

The invention relates to an improvement in fire guards and the object of the invention is to provide a device whereby one can protect a selected area from the ravages of prairie or other such like fires, the guard having an appliance whereby one can safely burn an encompassing strip around the area to be protected and in so doing prevent a prairie fire from reaching the restricted area.

With the above object in view the invention consists essentially in a portable water tank, outstanding supports secured to the water tank and carrying spray nozzles, hose communicating with the nozzles and the tank, a torch support connected with the tank and following the spray nozzles and carried by the latter support, the parts being arranged and constructed as hereinafter more particularly described and later pointed out in the appended claim.

Figure 1:
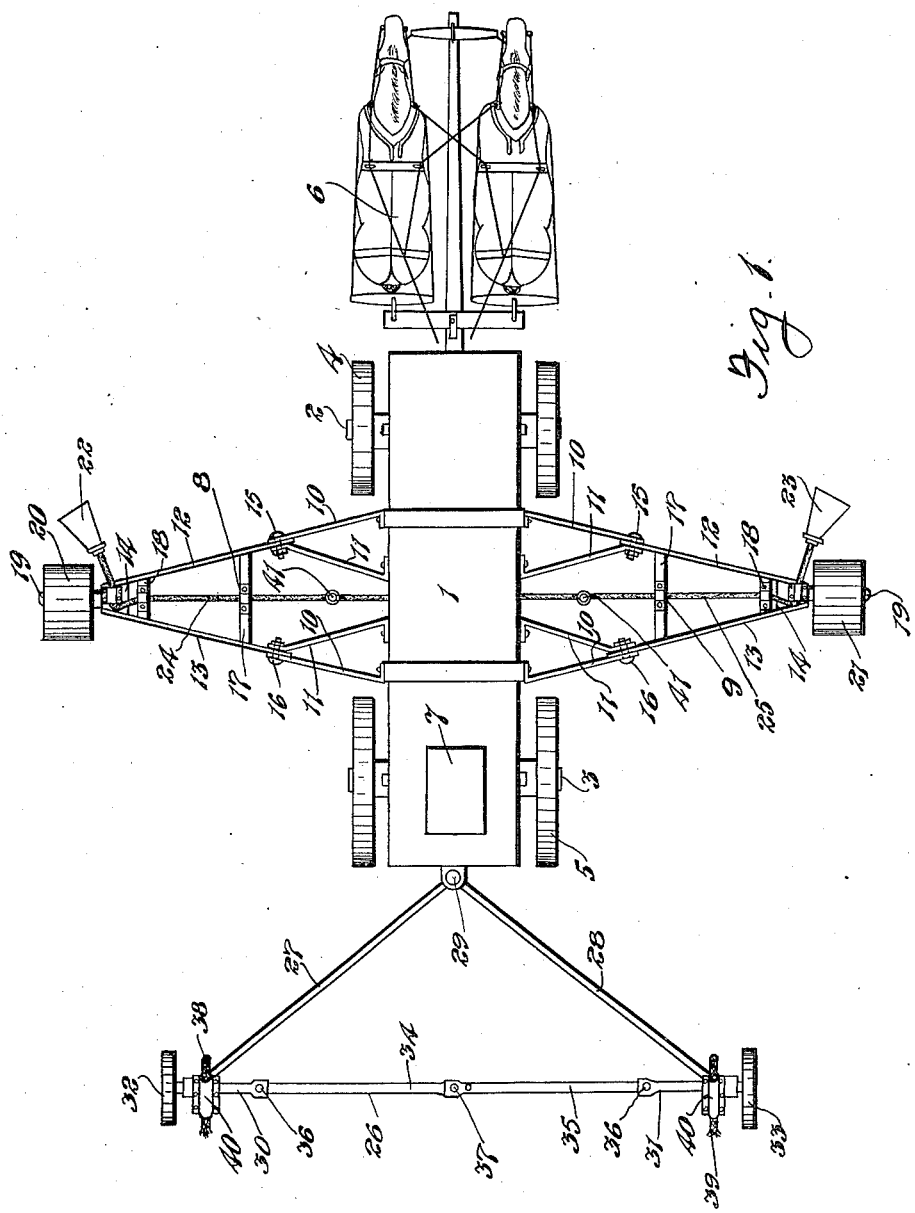
Figure 2:
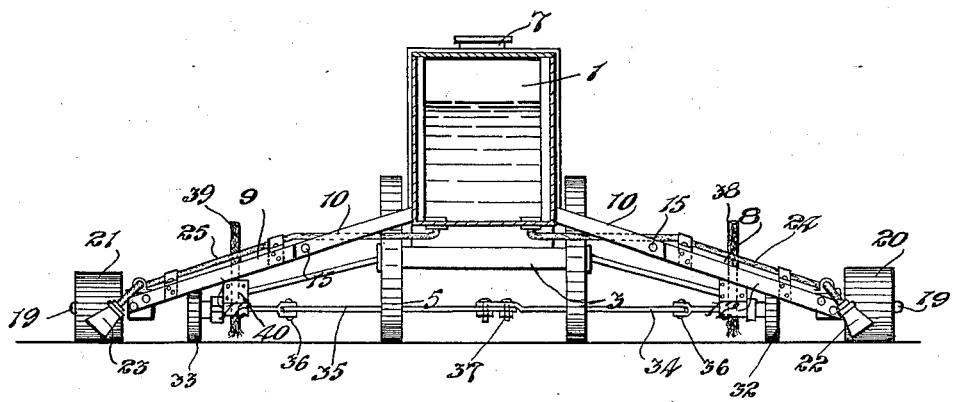
Figure 3:
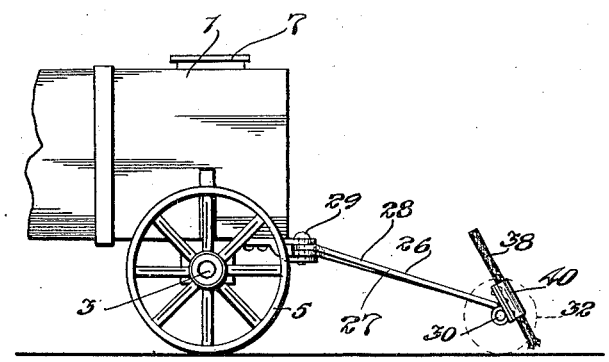

Figure 1 represents a plan view of my complete invention. Fig. 2 represents a sectional view through the tank, the spray nozzle supports, nozzles and adjoining parts being shown in side elevation. Fig. 3 represents a side view of a portion of the rear end of the device.

In the drawings like characters of reference indicate corresponding parts in each figure.

1 represents a tank suitably mounted on front and rear axles 2 and 3 provided with carriage wheels 4 and 5. The tank is arranged to be drawn by suitable draft animals indicated at 6 which are attached thereto.

7 is a filling opening whereby water can be placed in the tank.

8 and 9 represent similar nozzle supports secured to and located on each side of the tank. These supports each comprise pairs of brackets 10 and 11 fastened to the tank, which brackets carry in each instance outstanding arms 12 and 13 having their outer ends connected to suitable blocks 14 and their inner ends fastened to the brackets by bolts 15 and 16.

17 and 18 are brace bars between the arms. The blocks 14 carry extending stub axles 19 on which I have mounted rollers 20 and 21, the rollers being provided with wide treads for a purpose hereinafter explained.

22 and 23 are spray nozzles located in advance of the rollers and connected to hose 24 and 25 which have their inner ends communicating with the interior of the tank. The hose are secured in each instance to the braces 17 and 18 and blocks 14 by suitable straps and they are constructed so that they will bend freely at a point adjoining the brace 17 to permit the arms with attached rollers to be swung up and rested against the sides of the tank. This latter arrangement is simply to permit the device to pass along the usual highway, through gates or over bridges when required. It is here explained that the arms extend a considerable distance from the sides of the tank, the distance between rollers in an actual machine being possibly in the neighborhood of twenty feet.

Behind the tank and connected to the same I have placed a torch support 26 constructed in the following manner: 27 and 28 are two similar bars pivotally secured at the forward ends to the tank by a pivot pin 29 and having their rear ends permanently fastened to stub shafts 30 and 31, at the outer ends of which I have mounted carriage wheels 32 and 33. The stub shafts are held apart by intervening rods 34 and 35 having their outer ends pivotally secured to the stub shafts by pivot pins 36 and their inner ends releasably fastened one to the other by bolt 37. 38 and 39 represent torches carried by suitable sockets 40 permanently secured to the stub axles 30 and 31 respectively. The torches are directed downwardly to the ground and are contained within the area sprayed by the nozzles. The hose are supplied with suitable valves 41 to control the passage of water to the nozzles. The fire guard is used in the following manner, assuming one wishes to protect a certain area from the ravages of fire such as a prairie fire: The guard is driven around the area to be restricted from fire, water being sprayed through the nozzles to thoroughly wet the growth or material on the ground in advance of the rollers. At the same time the torches, which are ignited immediately after the machine has been started, follow up and set fire to the material or growth on the ground between the two wet strips as sprayed by the nozzles. After the machine has passed around the area aforesaid there will be a burnt gap which will effectively prevent the fire from jumping across and burning the area restricted by the fire guard.

It will be seen that by spraying two strips as just explained I am able to limit the area which I burn with the torches as the fires started by the torches will not travel through the areas wetted by the sprays but will simply burn up all inflammable material located between them.

I have made the support for the torches so that one can collapse the bars 27 and 28 by simply undoing the bolt 37 as is clearly apparent from the drawings. This also permits the device to pass through narrow places such as gates or over structures such as bridges.

Although I have entered into the details of the supports for the nozzles and the torches, still it will be understood that I do not wish to be restricted to the structure described as many other equally efficient mechanical devices for holding the nozzles and torches could be readily suggested.

The principal feature of the invention resides in providing a portable device equipped forwardly with outstanding spray nozzles and rearwardly with torches or other similar fire kindling devices, which devices are arranged to set on fire the area located between the strips sprayed by the nozzles. The rollers are made with a wide tread so that they will beat down the growth on the ground and in so doing materially add to the effect of the spraying in checking the fire.

What I claim as my invention is:—

In combination a portable water tank, outstanding supports carried by the water tank and at opposite sides thereof rollers supporting the outer ends of the supports, nozzles located at the outer ends of the supports, said nozzles projecting forwardly in the path of the rollers, hose connecting the nozzles with the tank, said hose being provided with suitable valves, a support connected to the rear end of the tank and torches carried by the latter support, as and for the purpose specified.

Signed at Watrous this 10th day of February, 1913.

AMOS MOORE RANNEY.

In the presence of—
 EDNA M. DOUGLAS,
 W. B. THOMSON.